United States Patent
Messner et al.

(10) Patent No.: US 8,691,744 B2
(45) Date of Patent: Apr. 8, 2014

(54) SILOXANE COPOLYMERS AND METHODS FOR PRODUCTION THEREOF

(75) Inventors: Michael Messner, Semmelsberg (DE); Sabine Hoffmann, Radebeul (DE); Jens-Peter Moldenhauer, Burghausen (DE)

(73) Assignee: Wacker Chemie AG, Munich (DE)

( * ) Notice: Subject to any disclaimer, the term of this patent is extended or adjusted under 35 U.S.C. 154(b) by 206 days.

(21) Appl. No.: 13/133,475

(22) PCT Filed: Dec. 8, 2009

(86) PCT No.: PCT/EP2009/066612
§ 371 (c)(1), (2), (4) Date: Jun. 8, 2011

(87) PCT Pub. No.: WO2010/066722
PCT Pub. Date: Jun. 17, 2010

(65) Prior Publication Data
US 2011/0245144 A1    Oct. 6, 2011

(30) Foreign Application Priority Data
Dec. 9, 2008    (DE) .......................... 10 2008 054 434

(51) Int. Cl.
*C11D 9/36* (2006.01)

(52) U.S. Cl.
USPC ........... 510/417; 510/122; 510/276; 510/287; 510/327; 510/343; 510/347; 510/466; 510/515

(58) Field of Classification Search
USPC ......... 510/122, 276, 287, 327, 347, 343, 417, 510/466, 515
See application file for complete search history.

(56) References Cited

U.S. PATENT DOCUMENTS

| | | | |
|---|---|---|---|
| 7,329,699 B2 * | 2/2008 | Liew et al. | 524/261 |
| 7,427,648 B2 | 9/2008 | Ochs | |
| 2005/0272862 A1 * | 12/2005 | Ochs et al. | 524/591 |
| 2008/0200608 A1 | 8/2008 | Burger | |
| 2011/0245144 A1 | 10/2011 | Messner et al. | |

FOREIGN PATENT DOCUMENTS

| | | |
|---|---|---|
| EP | 1353005 A1 | 10/2003 |
| EP | 1607427 | 12/2005 |
| JP | 2002309488 A2 | 10/2002 |
| JP | 2003155671 A | 5/2003 |
| JP | 2005344116 A | 12/2005 |
| WO | 2010066722 A1 | 6/2010 |

OTHER PUBLICATIONS

Ullmann's Encyclopedia of Industrial Chemistry, Release 2008, 7th Edition, Polyurethanes, Kapitel 3.1.3. Blocked Isocyanates.
International Search Report for PCT/EP2009/066612 filed Dec. 8, 2009, mailed Jun. 1, 2010.
English PatBase Abstract corresponding to JP 2003-155671 A.

\* cited by examiner

*Primary Examiner* — Charles Boyer
(74) *Attorney, Agent, or Firm* — RatnerPrestia

(57) ABSTRACT

Siloxane copolymers producible by (a) reacting organopolysiloxanes (1) having a Si-bound hydrogen atom with linear oligomeric or polymeric compounds (2) of the general formula $R^1\text{-}(A\text{-}C_nH2_n)_m\text{-}A^1\text{-}H$ (I), (b) reacting the resultant $H\text{-}A^1$ group-bearing intermediates (4) with organic compounds (5) having at least two isocyanate groups in the presence of further organic compounds (6) and (7) which are reactive toward isocyanate groups, wherein the compounds (6) contain at least one tertiary amine group and the compounds (7) can be eliminated from the siloxane copolymer in a temperature range from 50° C. to 250° C., wherein free isocyanate groups are formed in the siloxane copolymer, and (c) partially or completely quaternizing the amine-containing intermediates (8) from step (b) with an alkylating agent (9).

14 Claims, No Drawings

SILOXANE COPOLYMERS AND METHODS FOR PRODUCTION THEREOF

CROSS REFERENCE TO RELATED APPLICATIONS

This application is the national phase filing of international patent application No. PCT/EP2009/066612, filed 8 Dec. 2009, and claims priority of German patent application number 10 2008 054 434.5, filed 9 Dec. 2008, the entireties of which applications are incorporated herein by reference.

FIELD OF THE INVENTION

This invention relates to siloxane copolymers, in particular hydrophilic siloxane copolymers and to a process for preparing them.

BACKGROUND OF THE INVENTION

U.S. Pat. No. 7,427,648 describes hydrophilic siloxane copolymers obtained by reaction of siloxane-polyether copolymers with diisocyanate in the presence of a tertiary amine and subsequent alkylation of the amine groups. These siloxane copolymers and/or their emulsions are useful as hydrophilic softeners for textile fabrics in that the emulsions are stable in the basic medium and under the conditions of the state of the art jet applications, i.e., under the influence of shearing forces. But it is the laundering durability of the hydrophilizing and softening effect that is decisive for the utility of a soft-hand finish. The hydrophilic siloxane copolymers described in U.S. Pat. No. 7,427,648 do in this respect represent an improvement over the then prior art described therein, but are unsatisfactory in respect of laundering durability.

SUMMARY OF THE INVENTION

The present invention has for its object to provide siloxane copolymers which endow textile surfaces with good softness and an improved durability to laundering. We have found that this object is achieved by the invention.

DETAILED DESCRIPTION OF THE INVENTION

The invention accordingly provides siloxane copolymers preparable by
(a) A First Step of Reacting
organopolysiloxanes (1) which have at least one silicon-attached hydrogen atom and preferably two or more silicon-attached hydrogen atoms per molecule with substantially linear oligomeric or polymeric compounds (2) of the general formula

$$R^1\text{-}(A\text{-}C_nH_{2n})_m\text{-}A^1\text{-}H \quad (I)$$

where $R^1$ is a univalent optionally substituted hydrocarbyl radical capable of adding Si—H groups in a hydrosilylation reaction,
preferably a hydrocarbyl radical having an aliphatic carbon-carbon multiple bond,
A is a bivalent polar organic radical selected from the group consisting of —O—, —C(O)—O—, —O—C(O)—, —O—C(O)—O—, —C(O)—NH—, —NH—C(O)—, urethane radical and urea radical, preferably an oxygen atom —O—,
$A^1$ is a bivalent polar organic radical selected from the group consisting of —O—, —NH— and —NR'— (where R' is a univalent hydrocarbyl radical of 1 to 18 carbon atoms), preferably an oxygen atom —O—, n is an integer from 1 to 20, preferably from 1 to 4 and more preferably 2 or 3, and m is 0 or a positive integer, preferably from 5 to 50,
(b) A Second Step of Reacting
the resulting H-$A^1$-containing intermediates (4) with organic compounds (5), which have two or more isocyanate groups per molecule, the reaction taking place in the presence of further organic compounds (6) and (7), which are reactive toward isocyanate groups with the proviso that the compounds (6) contain at least one tertiary amine group,
and that the compounds (7) are those which can be redetached again from the siloxane copolymer in a temperature range from 50° C. to 250° C., preferably 100° C. to 200° C., resulting once more in free isocyanate groups in the siloxane copolymer, and
(c) A Third Step
of the amino-containing intermediates (8) from step (b) being partially or completely quaternized with an alkylating agent (9),
with the proviso that the water content of the compounds (1) and (2), which are used for preparing the siloxane copolymers, is lower than 2000 weight ppm, preferably less than 1500 weight ppm and more preferably less than 1000 weight ppm in each case based on the total weight of compounds (1) and (2).

The water content is based on room temperature (20° C.) and the pressure of the ambient atmosphere (1020 Hpa).

The siloxane copolymers of the present invention are preferably hydrophilic.

Siloxane copolymers of the present invention represent a distinct improvement in laundering durability coupled with improved hand level compared with the prior art. Blocked isocyanate groups are incorporated for this in the siloxane copolymer. Free isocyanate groups are obtainable again by detaching the blocking agent from the isocyanate groups. A simple way to effect detachment is to heat the siloxane copolymers to temperatures in the range from 50° C. to 250° C. This makes it possible to apply the polymer to the substrate in a customary manner, for example in the form of an emulsion or a solution, and simply by heating to produce free isocyanate groups in the polymer which are then in turn capable of forming covalent bonds with the substrate.

The blocking of polyisocyanates for temporary protection of the isocyanate groups is known and is described for example in Ullmann's Encyclopedia of Industrial Chemistry, Release 2008, 7th Edition, under polyurethanes, in chapter 3.1.3. Blocked Isocyanates.

The siloxane copolymers of the present invention have a viscosity of preferably 1000 to 100 000 000 mPa·s at 25° C. and more preferably 10 000 to 10 000 000 mPa·s at 25° C.

The present invention further provides a process for preparing siloxane copolymers by
(a) A First Step of Reacting
organopolysiloxanes (1) which have at least one silicon-attached hydrogen atom and preferably two or more silicon-attached hydrogen atoms per molecule with substantially linear oligomeric or polymeric compounds (2) of the general formula

$$R^1\text{-}(A\text{-}C_nH_{2n})_m\text{-}A^1\text{-}H \quad (I)$$

where $R^1$ is a univalent optionally substituted hydrocarbyl radical capable of adding Si—H groups in a hydrosilylation reaction, preferably a hydrocarbyl radical having an aliphatic carbon-carbon multiple bond, A is a bivalent polar organic radical selected from the group consisting of —O—, —C(O)—O—, —O—C(O)—, —O—C(O)—O—, —C(O)—NH—, —NH—C(O)—, urethane radical and urea radical, preferably an oxygen atom —O—, $A^1$ is a bivalent polar organic radical selected from the group consisting of —O—, —NH— and —NR'— (where R' is a univalent hydrocarbyl radical of 1 to 18 carbon atoms), preferably an oxygen atom —O—, n is an integer from 1 to 20, preferably from 1 to 4 and more preferably 2 or 3 and m is zero or a positive integer, preferably from 5 to 50, (b) A Second Step of Reacting the resulting H-$A^1$-containing intermediates (4) with organic compounds (5), which have two or more isocyanate groups per molecule, the reaction taking place in the presence of further organic compounds (6) and (7), which are reactive toward isocyanate groups with the proviso that the compounds (6) contain at least one tertiary amine group, and that the compounds (7) are those which can be redetached again from the siloxane copolymer in a temperature range from 50° C. to 250° C., resulting once more in free isocyanate groups in the siloxane copolymer, and (c) A Third Step of the amino-containing intermediates (8) from step (b) being partially or completely quaternized with an alkylating agent (9), with the proviso that the water content of the compounds (1) and (2), which are used for preparing the siloxane copolymers, is lower than 2000 weight ppm, preferably less than 1500 weight ppm and more preferably less than 1000 weight ppm in each case based on the total weight of compounds (1) and (2).

The first step of the process, step (a), preferably utilizes linear, cyclic or branched organopolysiloxanes (1) constructed of units of the general formula

  (II)

where

R in each occurrence may be the same or different and is a univalent optionally substituted hydrocarbyl radical having 1 to 18 carbon atoms per radical, e is 0, 1, 2 or 3, f is 0, 1 or 2, and the sum total of e+f is 0, 1, 2 or 3, with the proviso that each molecule has at least one silicon-attached hydrogen atom and preferably 2 or more silicon-attached hydrogen atoms.

Preferred organopolysiloxanes (1) have the general formula

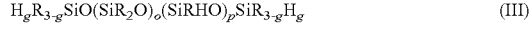  (III)

where R is as defined above, g is 0, 1 or 2, o is 0 or an integer from 1 to 1500, and p is 0 or an integer from 1 to 200, with the proviso that each molecule has at least one silicon-attached hydrogen atom and preferably two or more silicon-attached hydrogen atoms.

Formula (III) of this invention is to be understood as meaning that the o units of —(SiR$_2$O)— and the p units of —(SiRHO)— may form any desired distribution in the organopolysiloxane molecule.

It is particularly preferable for g in the formula (III) to be 1, for p in the formula (III) to be 0 and for α,ω-dihydropolydiorganosiloxanes and especially α,ω-dihydropolydimethylsiloxanes to be used as organopolysiloxanes (1).

The organopolysiloxanes (1) preferably have an average viscosity of 10 to 1000 mPa·s at 25° C.

Examples of examples of R radicals are alkyl radicals, such as methyl, ethyl, n-propyl, isopropyl, 1-n-butyl, 2-n-butyl, isobutyl, tert-butyl, n-pentyl, isopentyl, neopentyl, tert-pentyl, hexyl radicals, such as n-hexyl, heptyl radicals, such as n-heptyl, octyl radicals, such as n-octyl and isooctyl radicals, such as 2,2,4-trimethylpentyl, nonyl radicals, such as n-nonyl, decyl radicals, such as n-decyl, dodecyl radicals, such as n-dodecyl, and octadecyl radicals, such as n-octadecyl; cycloalkyl radicals, such as cyclopentyl, cyclohexyl, cycloheptyl and methylcyclohexyl; aryl radicals, such as phenyl, naphthyl, anthryl and phenanthryl; alkaryl radicals, such as o-, m-, p-tolyl radicals, xylyl radicals and ethylphenyl radicals; and aralkyl radicals, such as benzyl, α-phenylethyl and β-phenylethyl.

Examples of substituted R radicals are haloalkyl radicals, such as 3,3,3-trifluoro-n-propyl, 2,2,2,2',2',2'-hexafluoroisopropyl, heptafluoroisopropyl and haloaryl radicals, such as o-, m- and p-chlorophenyl.

The R radical is preferably a univalent hydrocarbyl radical of 1 to 6 carbon atoms, methyl being particularly preferred.

Examples of R radicals fully apply to R' radicals.

$R^1$ is preferably a univalent hydrocarbyl radical possessing an aliphatic carbon-carbon multiple bond.

Examples of $R^1$ radicals are alkenyl radicals, such as vinyl, 5-hexenyl, cyclohexenyl, 1-propenyl, allyl, 3-butenyl and 4-pentenyl, and alkynyl radicals, such as ethynyl, propargyl and 1-propynyl.

The $R^1$ radical is preferably an alkenyl radical, especially ω-alkenyl, and allyl is particularly preferred.

Preference for use as oligomeric or polymeric (m>0) compounds (2) is given to polyethers of the general formula

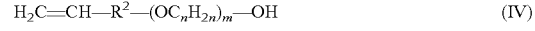  (IV)

where $R^2$ is a bivalent hydrocarbyl radical of 1 to 20 carbon atoms, preferably a radical of the formula —CH$_2$—, —CH(CH$_3$)— or —C(CH$_3$)$_2$— and n and m are each as defined above.

Preferred examples of polyethers (2) are those of the general formula

  (IV')

where $R^2$ is as defined above and a and b is 0 or an integer from 1 to 200, with the proviso that the sum total of a+b is not less than 1 and preferably from 5 to 50.

Further examples of oligomeric or polymeric compounds (2) are unsaturated polyesters, such as H$_2$C=CH—R$^2$—[O(O)CC$_n$H$_{2n}$]$_m$—OH, unsaturated polycarbonates, such as H$_2$C=CH—R$^2$—[OC(O)OC$_n$H$_{2n}$]$_m$—OH, and unsaturated polyamides, such as H$_2$C=CH—R$^2$—[NHC(O)C$_n$H$_{2n}$]$_m$—NH$_2$, where R$^2$, n and m are each as defined above.

Preference for use as monomeric (m=0) compounds (2) is given to unsaturated compounds of the formula H$_2$C=CH—R$^{2'}$—OH, where R$^{2'}$ has the meaning of R$^2$ and is preferably a radical of the formula —(CH$_2$)$_n$— where n is as defined above. Preferred monomeric compounds (2) are allyl alcohol, 5-hexenol and 7-octenol.

The amounts in which the compounds (2) are used in the first step (a) are preferably in the range from 1.0 to 4.0 and preferably from 1.3 to 2.5 mol of $R^1$ radical, which is preferably a radical having an aliphatic carbon-carbon multiple bond and preferably is an ω-alkenyl radical, per gram atom of silicon-attached hydrogen in organopolysiloxane (1).

Excess monomeric compounds (2) used can either be left in the reaction mixture or be wholly or partly removed by distillation insofar as their volatility permits.

The first step (a) preferably utilizes catalysts (3) to promote the addition of silicon-attached hydrogen onto aliphatic unsaturation. Useful catalysts (3) for the process of the present invention include the same catalysts as hitherto used to promote the addition of silicon-attached hydrogen onto aliphatic unsaturation. The catalysts are preferably a metal from the group of the platinum metals or a compound or complex from the group of the platinum metals. Examples of such catalysts are metallic and finely divided platinum, which may be on supports, such as silicon dioxide, aluminum oxide or activated carbon, compounds or complexes of platinum, such as platinum halides, examples being $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without detectable inorganically bound halogen, bis(gammapicoline) platinum dichloride, trimethylenedipyridineplatinum dichloride, dicyclopentadieneplatinum dichloride, dimethyl-sulfoxideethyleneplatinum(II) dichloride, cyclooctadieneplatinum dichloride, norbornadieneplatinum dichloride, gamma-picolineplatinum dichloride, cyclopentadieneplatinum dichloride, and also reaction products of platinum tetrachloride with olefin and primary amine or secondary amine or primary and secondary amine, such as the reaction product of platinum tetrachloride dissolved in 1-octene with secbutylamine or ammonium-platinum complexes.

The amount in which catalyst (3) is used in the first step (a) is preferably in the range from 1 to 50 weight ppm (parts by weight per million parts by weight) and more preferably in amounts of 2 to 20 weight ppm, all reckoned as elemental platinum and based on the total weight of organopolysiloxanes (1) and compounds (2).

The first step of the process, step (a), is preferably carried out at the pressure of the ambient atmosphere i.e., at 1020 hPa absolute, say, but can also be carried out at higher or lower pressures. Furthermore, the first step of the process is preferably carried out at a temperature in the range from 60° C. to 140° C. and more preferably at a temperature in the range from 80° C. to 120° C.

The second step of the process, step (b), preferably utilizes organic compounds (5), which have two or more isocyanate groups per molecule, that have the general formula $$O=C=N-R^3-N=C=O \quad (V)$$

where $R^3$ is a bivalent hydrocarbyl radical having 4 to 40 carbon atoms per radical.

Examples of organic compounds (5) are hexamethylene 1,6-diisocyanate, isophorone diisocyanate, tolylene 2,4-diisocyanate, tolylene 2,6-diisocyanate, phenylene 1,3-diisocyanate, 4,4'-methylenebis(cyclohexylisocyanate), 4,4'-methylenebis(phenyl isocyanate) and dimethylphenyl diisocyanate.

The amounts in which organic compounds (5) are used in the second step (b) are preferably in the range from 0.5 to 1.0 mol and more preferably in the range from 0.8 to 1.0 mol of isocyanate group per mole of the sum total of isocyanate-reactive groups present in the intermediates (4) and the organic compounds (6) and (7). It is thus at all times ensured that all the dangerous isocyanate groups will safely react.

The second step of the process, step (b), preferably utilizes organic compounds (6), which are reactive toward isocyanate groups and which contain at least one tertiary amine group, of the general formulae $$HX-R^5-NR^4_2 \quad (VI),$$

$$HX-R^6-(NR^4_2)_2 \quad (VII),$$

$$HX-R^7(NR^4_2)_3 \quad (VIII),$$

$$(HX)_2R^6-NR^4_2 \quad (IX),$$

$$HR^8N-R^5-NR^4_2 \quad (X),$$

where $R^4$ is an R radical which may optionally contain oxygen, sulfur or nitrogen atoms, preferably a methyl, ethyl or propyl radical which may optionally contain a hydroxyl and/or peralkylated amine radical, $R^5$ is a bivalent hydrocarbyl radical of 1 to 100 carbon atoms, preferably of 1 to 50 carbon atoms and more preferably of 1 to 20 carbon atoms which may be oxygen, sulfur or nitrogen atoms interrupted or substituted, $R^6$ is a tervalent organic radical having 1 to 100 carbon atoms per radical, preferably a tervalent hydrocarbyl radical having 1 to 100 carbon atoms, preferably having 1 to 20 carbon atoms and more preferably having 1 to 10 carbon atoms, which contains one or more oxygen atoms, $R^7$ is a tetravalent organic radical having 1 to 100 carbon atoms per radical, preferably a tetravalent hydrocarbyl radical having 1 to 20 carbon atoms which contains one or more oxygen atoms, $R^8$ is a hydrogen atom or $R^4$, and X is an oxygen atom or a sulfur atom, preferably an oxygen atom.

Examples of organic compounds (6) of the general formula (VI) are N,N-dimethylethanolamine, N,N-diethylpropanolamine, N-(3-aminopropyl)-N-methylethanolamine, N-(dimethyl-3-aminopropyl)-N-methylethanolamine, N,N-dimethyl-2-(2-aminoethoxy)ethanol, N-methyldiethanolamine, N-methyldipropanolamine, N-dodecyldiethanolamine, N-stearyldipropanolamine, dimethylaminopropyldipropanolamine, triethanolamine, N,N-bis(dimethylaminopropyl)-2-hydroxyethylamine, N,N-bis(dimethylaminopropyl)-2-hydroxypropylamine, N,N-dimethyl-2-mercaptoethylamine and N,N-diethyl-3-mercaptopropylamine.

Examples of organic compounds (6) of the general formula (VII) are 1,5-bis(dimethylamino)pentan-3-ol, 1,7-bis(dimethylamino)heptan-4-ol, 1,5-bis(dimethylamino)pentan-3-thiol and 1,7-bis(dimethylamino)heptan-4-thiol.

Examples of organic compounds (6) of the general formula (VIII) are 2,4,6-tris(dimethylaminomethyl)phenol, 1,1,1-tris(dimethylaminomethyl)methanol, 2,4,6-tris(dimethylaminomethyl)cyclohexanol, 2,4,6-tris(dimethylaminomethyl)thiophenol, 1,1,1-tris(dimethylaminomethyl)methanethiol and 2,4,6-tris(dimethylaminomethyl)cyclohexanethiol.

Examples of organic compounds (6) of the general formula (IX) are N,N-bis(dimethylaminopropyl)-3-aminopropane-1,2-diol, N,N-bis(dimethylaminopropyl)-2-aminopropane-1,3-diol and N,N-bis(3-dimethylaminopropyl)carbaminomonoglyceride.

Examples of organic compounds (6) of the general formula (X) are N,N-dimethylethylenediamine, N,N-diethylethylenediamine, N,N-dimethyl-N'-methylethylenediamine, N,N- dimethylpropylenediamine, N,N-dimethyl-N'-methylpropylenediamine, N,N-bis(dimethyl-3-aminopropyl)amine, N,N-bis(3-aminopropyl)methylamine, N-methyl-N'-(2-aminoethyl)piperazine, N-(3-aminopropyl)morpholine and N-(3-aminopropyl)imidazole.

The compounds of the formula (VI) to (X) thus serve to introduce quaternizable nitrogen into the siloxane copolymer.

The second process step (b) further utilizes organic compounds (7) which contain hydrogen atoms reactive toward isocyanate groups, although the compounds (7) can be redetached again from the polymer in a temperature range of 50° C. to 250° C. to re-form isocyanate groups, and have the following structures:
HB or HBH,
where B is an organic radical having one or two hydrogen atoms reactive toward isocyanate groups.

The compounds (7) HB or HBH and their reactive hydrogen atoms first react in the sense of reaction equations I/II with isocyanate groups in polymer (P) and thus form a polymer free of isocyanate groups:

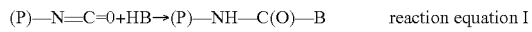
(P)—N=C=O+HB→(P)—NH—C(O)—B     reaction equation I

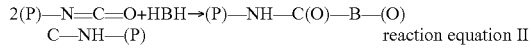
2(P)—N=C=O+HBH→(P)—NH—C(O)—B—(O)
   C—NH—(P)     reaction equation II

After the polymer has been applied to the desired substrate, this reaction can be reversed again, for the purpose of better attachment of the polymer to the substrate, by simply heating in accordance with reaction equations III/IV:

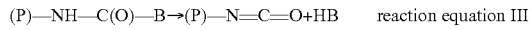
(P)—NH—C(O)—B→(P)—N=C=O+HB     reaction equation III

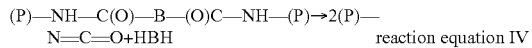
(P)—NH—C(O)—B—(O)C—NH—(P)→2(P)—
   N=C=O+HBH     reaction equation IV Examples of compounds (7) of the HB type are oximes (e.g., acetone oxime, butanone oxime), phenols, lactams (e.g., ε-caprolactam), carbon acid compounds such as malonates (e.g., diethyl malonate), acetoacetates (e.g., methyl acetoacetate) or ketones (e.g., cyclopentanone-2-carboxylic methyl ester), pyrazoles (e.g., 3,5-dimethylpyrazole), hydroxamic acids (benzylmethacrylhydroxamic acid), secondary monoamines (e.g., diethylamine) and hydroxylamines (e.g., diethylhydroxylamine).

Examples of compounds (7) of the HBH type are dioximes (e.g., dimethylglyoxime), diphenols (e.g., hydroquinone) or secondary diamines (e.g., piperazine).

The amounts in which organic compounds (6) and (7) are used in the second step (b) are preferably in the range from 0.01 to 1 mol, and more preferably in the range from 0.05 to 1 mol of the total of HX or $HR^8N$ groups in (6) and HB groups in (7) per mole of $H-A^1$ group in intermediate (4).

The second step of the process, step (b), is preferably carried out at the pressure of the ambient atmosphere i.e., at 1020 hPa absolute, say, but can also be carried out at higher or lower pressures. Furthermore, the second step of the process is preferably carried out at a temperature in the range from 40° C. to 140° C. and more preferably at a temperature in the range from 60° C. to 100° C.

The reaction in the second step (b) of the process according to the present invention may further utilize condensation catalysts, such as di-n-butyltin dilaurate, tin(II) octoate, dibutyltin diacetate, zinc dilaurate, bismuth trilaurate, potassium octoate or tertiary amines without any further functional groups reactive toward isocyanate groups, examples being dimethylcyclohexylamine, pentamethyldipropylenetriamine, N-methylimidazole or N-ethylmorpholine.

The third step (c) of the process utilizes alkylating agents (9) which are preferably selected from alkyl halides, dialkyl sulfates, sulfonic esters, epoxides, chlorohydrins and onium salts of oxygen or of sulfur and more preferably from alkyl halides, sulfonic esters and epoxides.

Examples of suitable alkylating agents (9) are methyl chloride, ethyl chloride, methyl bromide, ethyl bromide, methyl iodide, ethyl iodide, dodecyl bromide, benzyl chloride, chloroacetic acid and chloroacetic ester, dimethyl sulfate, diethyl sulfate, the methyl esters of fluorosulfonic acid, of chlorosulfonic acid, of methanesulfonic acid, of trifluoromethanesulfonic acid, of p-toluenesulfonic acid and of naphthylsulfonic acid, 2,2-dimethyloxirane, 1,2-propylene oxide, 1,2-epoxybutane, 2,3-epoxypropyl isopropyl ether, 2,3-epoxypropyl butyl ether, allyl glycidyl ether, 2,3-epoxypropyltrimethylammonium chloride, 3-chloro-1-methoxy-2-propanol, 3-chloro-1,2-propanediol, epichlorohydrin, 3-chloro-2-hydroxypropyltrimethylammonium chloride and also Meerwein salts, such as trimethyloxonium tetrafluoroborate, triethyloxonium hexafluorophosphate and trimethylsulfonium hydroxide for example. Preferred examples are methyl chloride, methyl iodide, dodecyl bromide, benzyl chloride, chloroacetic acid, dimethyl sulfate and methyl p-toluenesulfonate.

Alkylating agents (9) are used in the third step (c) of the process in amounts of preferably 0.1 to 1.1 mol and more preferably 0.2 to 1 mol per mole of tertiary amine group in intermediates (8).

The third step of the process, step (c), is preferably carried out at the pressure of the ambient atmosphere i.e., at 1020 hPa absolute, say, but can also be carried out at higher or lower pressures. Furthermore, the third step of the process is preferably carried out at a temperature in the range from 0° C. to 200° C. and more preferably at a temperature in the range from 20° C. to 150° C., even more preferably in the range from 50° C. to 130° C.

A preferred siloxane copolymer is obtained for example by a first step of reacting an α,ω-dihydropolydiorganosiloxane (1) in excess with a polyether (2) of the formula (IV), a second step of reacting the intermediate (4), an HO-polyether-polysiloxanepolyether-HO, in the presence of a tertiary alkanolamine (6) of the formula (VI) and dimethyl glyoxime (7) with a diisocyanate (5) of the formula (V) while at the same time introducing urethane and tertiary amine groups and also blocked isocyanate groups into the siloxane copolymer and also binding free polyether from the first step by urethane formation, and a third step of quaternizing the intermediate (8), a polysiloxane-polyether copolymer consisting of the repeat units

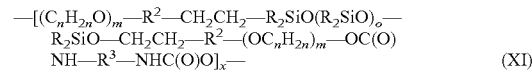
—[($C_nH_{2n}O$)$_m$—$R^2$—$CH_2CH_2$—$R_2SiO(R_2SiO)_o$—
$R_2SiO$—$CH_2CH_2$—$R^2$—($OC_nH_{2n}$)$_m$—OC(O)
NH—$R^3$—NHC(O)O]$_x$—     (XI)

and

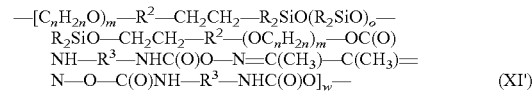
—[$C_nH_{2n}O$)$_m$—$R^2$—$CH_2CH_2$—$R_2SiO(R_2SiO)_o$—
$R_2SiO$—$CH_2CH_2$—$R^2$—($OC_nH_{2n}$)$_m$—OC(O)
NH—$R^3$—NHC(O)O—N=C($CH_3$)—C($CH_3$)=
N—O—C(O)NH—$R^3$—NHC(O)O]$_w$—     (XI')

and also the end groups

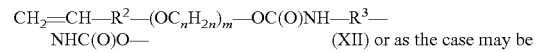
$CH_2$=CH—$R^2$—($OC_nH_{2n}$)$_m$—OC(O)NH—$R^3$—
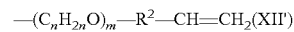
NHC(O)O—     (XII) or as the case may be —($C_nH_{2n}O$)$_m$—$R^2$—CH=$CH_2$(XII')

and

$R^4_2N$—$R^5$—OC(O)NH—$R^3$—NHC(O)O(XIII) or as the case may be

—$R^5$—$NR^4_2$     (XIII')

where R, $R^2$, $R^3$, $R^4$, $R^5$, n, m and o are each as defined above,
x is an integer from 1 to 20 and preferably from 1 to 4
w is an integer from 1 to 15 and preferably 1 to 3,
with methyl p-toluenesulfonate as an alkylating agent (9).

The siloxane copolymer thus obtained consists of the repeat units

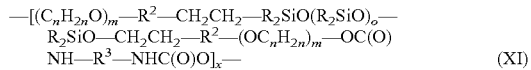 (XI)

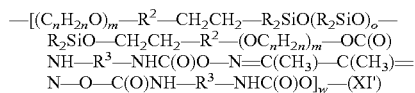 (XI')

and also the end groups

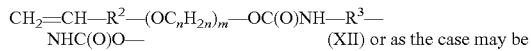 (XII) or as the case may be

 (XII')

 (XIII) or as the case may be

 (XIII')

and

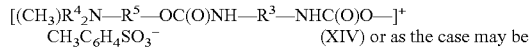 (XIV) or as the case may be

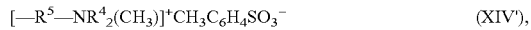 (XIV'), where R, $R^2$, $R^3$, $R^4$, $R^5$, f, n, m, o and x are each as defined above.

A further preferred siloxane copolymer is for example obtained similarly to the above-described procedure by utilizing a tertiary amine (6) of the formula (X) and butanone oxime in the second step of the process. The siloxane copolymer obtained then consists of the repeat unit

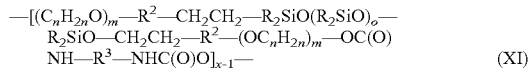 (XI)

and also the end groups

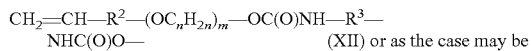 (XII) or as the case may be

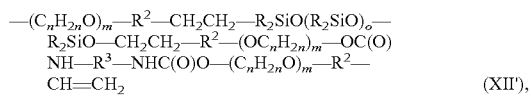 (XII'),

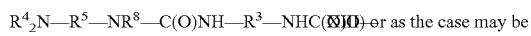 (XIII) or as the case may be

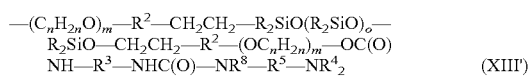 (XIII')

and

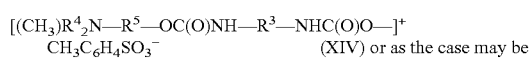 (XIV) or as the case may be

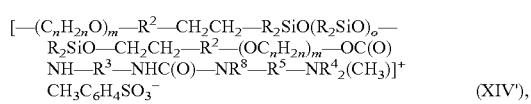 (XIV'), and also

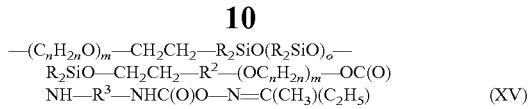 (XV)

where R, $R^2$, $R^3$, $R^4$, $R^5$, $R^8$, n, m, o and x are each as defined above.

The urethane groups in the hydrophilic siloxane copolymers of the present invention can act as donors and acceptors in the formation of hydrogen bonds, while the quaternary nitrogen groups serve to increase the hydrophilicity and solubility of the hydrophilic siloxane copolymers of the present invention and also to improve the stability of the aqueous emulsions in a basic medium and under the application conditions of state of the art jet systems, i.e., under the influence of shearing forces.

To reduce the in some instances very high product viscosities, low molecular weight materials, such as alcohols or ethers, can be added if appropriate. Examples thereof are ethanol, isopropanol, n-butanol, 2-butoxyethanol, diethylene glycol monobutyl ether, tetrahydrofuran, diethylene glycol diethyl ether and dimethoxyethane, of which diethylene glycol monobutyl ether is a preferred example. Preferred quantities added in the case of very viscous products are up to 50% by weight and more preferably up to 30% by weight, based on the siloxane copolymers of the present invention. Such additions also have the advantage that the resultant products are easier to disperse in water than the pure siloxane copolymers.

The siloxane copolymers of the present invention are easy to disperse in water without further auxiliaries, such as emulsifiers, i.e., are self-dispersing, and produce emulsions and especially microemulsions.

The present invention accordingly provides emulsions and preferably microemulsions comprising
(A) siloxane copolymers according to the present invention, and
(B) water.

The emulsion's content of the siloxane copolymers (A) according to the present invention is preferably in the range from 20% to 60% and more preferably in the range from 30% to 50% by weight.

The present invention further provides a process for producing the emulsions, preferably microemulsions, by mixing of
(A) siloxane copolymers according to the present invention, with
(B) water.

Technologies for producing silicone emulsions are known. Silicone emulsions are typically produced by simply stirring the siloxane copolymers of the present invention with water and if appropriate subsequent homogenization with rotor-stator homogenizers, colloid mills or high pressure homogenizers.

The siloxane copolymers of the present invention are preferably used for treatment of fibrous substrates, such as textile woven fabrics, fibers and non-wovens consisting of materials such as, for example, polyester, polyamide, wool, polyethylene or cellulosic fibers.

The siloxane copolymers of the present invention, or their emulsions, can be used as hydrophilic softeners in the textile industry, as hydrophilic rinse cycle fabric conditioners or as hydrophilic additives in the production and finishing of fibers and nonwovens. The compounds of the present invention are notable in particular for their simple synthesis, their high substantivity, the ease of production of their aqueous emulsions (self-dispersion) and also for their high stability in a basic medium and under the application conditions of state of the art jet systems, i.e., under the influence of shearing forces.

In addition, the compounds of the present invention, or their emulsions, endow textile wovens, fibers and nonwovens with a high hydrophilicity and also, after heating briefly to a temperature which is above the dissociation temperature of the blocked isocyanate, excellent softness coupled with very good durability to laundering.

In the examples described hereinbelow all viscosity data are based on a temperature of 25° C. Unless otherwise stated, the examples hereinbelow are carried out at a pressure of the ambient atmosphere, i.e., at 1020 hPa, say, and at room temperature, i.e., at about 23° C., or at a temperature which results when the components are added together at room temperature without additional heating or cooling. Furthermore, all parts and percentages are by weight, unless otherwise stated.

Example 1

3200 g of an α,ω-dihydropolydiorganosiloxane having 0.055% by weight of silicon-attached hydrogen and a water content of about 53 weight ppm are mixed with 1130 g of a polyether of the formula

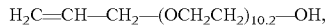

$H_2C=CH-CH_2-(OCH_2CH_2)_{10.2}-OH$, containing 1276 weight ppm of water, and heated to 100° C. 0.6 g of hexachloroplatinic acid dissolved in isopropanol (0.48% strength based on elemental platinum) is metered in, whereupon the temperature of the reaction mixture rises to 117° C. and a clear product is formed. Complete conversion of the silicon-attached hydrogen is achieved after one hour at 100 to 110° C. The polyether-polysiloxane intermediate (4) has a viscosity of about 970 mm$^2$/s at 25° C.

Comparative Test 1 (Noninventive):

6.27 g of N,N-dimethylethanolamine and 25.9 g of hexamethylene diisocyanate (0.999 mol of isocyanate group per mole of sum total of isocyanate-reactive groups in intermediate (4) and in N,N-dimethylethanolamine (6)) are then meteringly added in succession to 433 g of the intermediate (4) of Example 1 and left to stir at 100° C. for one hour. All the while, a distinct increase in viscosity takes place. The intermediate thus obtained contains about 14.4 meq./100 g of protonatable amine groups.

After cooling down to 80° C., 120 g of diethylene glycol monobutyl ether and also 4.25 g of acetic acid are added and the batch is left to stir at that temperature for a further hour to give a clear brownish oil.

40 g of the highly viscous oil are mixed with 60 g of water at 50° C. (Emulsion 1).

Example 2

4.39 g of N,N-dimethylethanolamine, 1.84 g of butanone oxime and 25.9 g of hexamethylene diisocyanate (0.999 mol of isocyanate group per mole of sum total of isocyanate-reactive groups in intermediate (4) and in N,N-dimethylethanolamine (6) and butanone oxime (7)) are then meteringly added in succession to 433 g of the intermediate (4) of Example 1 and left to stir at 100° C. for one hour. All the while, a distinct increase in the viscosity takes place. The intermediate thus obtained contains about 10.1 meq./100 g of protonatable amine groups.

The batch is subsequently cooled down to 80° C., admixed with 120 g of diethylene glycol monobutyl ether and also 2.96 g of acetic acid are added and left to stir at that temperature for a further hour to give a clear, brownish oil.

40 g of the highly viscous oil are mixed with 60 g of water at 50° C. (Emulsion 2).

Example 3

To 433 g of the intermediate (4) of Example 1 are then meteringly added in succession 4.39 g of N,N-dimethylethanolamine, 1.24 g of dimethyl glyoxime and 25.9 g of hexamethylene diisocyanate (0.999 mol of isocyanate group per mole of sum total of isocyanate-reactive groups in intermediate (4) and in N,N-dimethylethanolamine (6) and dimethyl glyoxime (7)) and left to stir at 100° C. for one hour. All the while, a distinct increase in the viscosity takes place. The intermediate thus obtained contains about 10.1 meq./100 g of protonatable amine groups.

The batch is cooled down to 80° C., admixed with 120 g of diethylene glycol monobutyl ether and also 2.96 g of acetic acid and left to stir at this temperature for a further hour to give a cloudy, slightly brownish oil.

40 g of the highly viscous oil are mixed with 60 g of water at 50° C. (Emulsion 3).

Example 4

To 433 g of the intermediate (4) of Example 1 are then meteringly added in succession 4.39 g of N,N-dimethylethanolamine, 1.54 g of diethylamine and 25.9 g of hexamethylene diisocyanate (0.999 mol of isocyanate group per mole of sum total of isocyanate-reactive groups in intermediate (4) and in N,N-dimethylethanolamine (6) and diethylamine (7)) and left to stir at 100° C. for one hour. All the while, a distinct increase in the viscosity takes place. The intermediate thus obtained contains about 10.1 meq./100 g of protonatable amine groups.

The batch is cooled down to 80° C., admixed with 120 g of diethylene glycol monobutyl ether and also 2.96 g of acetic acid and left to stir at this temperature for a further hour to give a clear, brownish oil.

40 g of the highly viscous oil are mixed with 60 g of water at 50° C. (Emulsion 4).

Example 5

To 433 g of the intermediate (4) of Example 1 are then meteringly added in succession: 4.39 g of N,N-dimethylethanolamine, 1.84 g of butanone oxime and 25.9 g of hexamethylene diisocyanate (0.999 mol of isocyanate group per mole of sum total of isocyanate-reactive groups in intermediate (4) and in N,N-dimethylethanolamine (6) and butanone oxime (7)) and left to stir at 100° C. for one hour. All the while, a distinct increase in the viscosity takes place. The intermediate thus obtained contains about 10.1 meq./100 g of protonatable amine groups.

The batch is cooled down to 80° C., admixed with 120 g of diethylene glycol monobutyl ether and also 9.17 g of methyl p-toluenesulfonate and left to stir at that temperature for a further hour to obtain a clear, brownish oil.

40 g of the highly viscous oil are mixed with 60 g of water at 50° C. (Emulsion 5).

Comparative Test 2 (Noninventive):

To 433 g of the intermediate (4) of Example 1 are then meteringly added in succession: 6.27 g of N,N-dimethylethanolamine, and 25.9 g of hexamethylene diisocyanate (0.999 mol of isocyanate group per mole of sum total of isocyanate-reactive groups in intermediate (4) and in N,N-dimethylethanolamine (6)) and left to stir at 100° C. for one hour. All the while, a distinct increase in the viscosity takes place. The intermediate thus obtained contains about 14.4 meq./100 g of protonatable amine groups.

The batch is cooled down to 80° C., admixed with 120 g of diethylene glycol monobutyl ether and also 13.1 g of methyl p-toluenesulfonate and left to stir at that temperature for a further hour to obtain a clear, brownish oil.

40 g of the highly viscous oil are mixed with 60 g of water at 50° C. (Emulsion 6).

Example 6

1000 g of an α,ω-dihydropolydiorganosiloxane having 0.053% by weight of silicon-attached hydrogen and a water content of 56 weight ppm are mixed with 1700 g of an allyl alcohol ethoxylate/propyloxylate of the formula

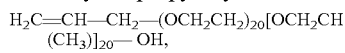

$H_2C=CH-CH_2-(OCH_2CH_2)_{20}[OCH_2CH(CH_3)]_{20}-OH$, and heated to 100° C. Then, 0.25 g of hexachloroplatinic acid dissolved in isopropanol (0.48% strength based on elemental platinum) is metered in, whereupon the temperature of the reaction mixture rises to 112° C. and a clear product is formed. Complete conversion of the silicon-attached hydrogen is achieved after two hours at 100 to 110° C. The polyether-polysiloxane intermediate (4) has a viscosity of about 1360 mm$^2$/s at 25° C.

Comparative Test 3 (Noninventive):

To 500 g of the intermediate (4) of Example 8 are then meteringly added in succession: 5.15 g of N,N-dimethylpropanolamine, and 16.8 g of hexamethylene diisocyanate (0.999 mol of isocyanate group per mole of sum total of isocyanate-reactive groups in intermediate (4) and in N,N-dimethylpropanolamine (6)) and left to stir at 100° C. for one hour. All the while, a distinct increase in the viscosity takes place. The intermediate thus obtained contains about 9.3 meq./100 g of protonatable amine groups.

The batch is cooled down to 80° C., admixed with 135 g of diethylene glycol monobutyl ether and also 3.0 g of acetic acid and left to stir at that temperature for a further hour to obtain a clear, brownish oil.

40 g of the highly viscous oil are mixed with 60 g of water at 50° C. (Emulsion 7).

Example 7

To 500 g of the product of Example 8 are then meteringly added in succession 3.61 g of N,N-dimethylpropanolamine, 1.31 g of butanone oxime and 16.8 g of hexamethylene diisocyanate (0.999 mol of isocyanate group per mole of sum total of isocyanate-reactive groups in intermediate (4) and in N,N-dimethylpropanolamine (6) and butanone oxime (7)) and left to stir at 100° C. for one hour. All the while, a distinct increase in the viscosity takes place. The intermediate thus obtained contains about 6.9 meq./100 g of protonatable amine groups.

The batch is cooled down to 80° C., admixed with 135 g of diethylene glycol monobutyl ether and also 4.25 g of acetic acid and left to stir at that temperature for a further hour to obtain a clear, brownish oil.

40 g of the highly viscous oil are mixed with 60 g of water at 50° C. (Emulsion 8).

Example 8

To determine the differences in the laundering durability of the hand properties of the various siloxane polymers, portions cut from a cotton terry material (480 g/m$^2$) were treated with the finish liquors reported in table 1 to a wet pick-up of about 80%. The textile specimens were each put into a tenter frame and dried at 120° C. for 2 minutes and then cured at 170° C. for 2 minutes. After storage overnight in a room conditioned to 23° C., the fabrics were each divided into three parts. One part of each sample was kept in the conditioning room and one part was washed once and the further part three times under the following conditions: domestic wash at 60° C. with commercially available washing machine using a common fully built laundry detergent, wash cycle about 90 minutes. Afterwards, the washed fabric samples were also put back again to the conditioning chamber for drying. Thereafter, the relative softness of the washed samples was judged against the unwashed sample (100% softness) and the blank (0% softness) by a panel of five judges. The results are summarized in tables 2 and 3.

Whereas the softness decreases to about 10 to 15% of the original value after 3 washes in the case of textile specimens 1, 6 and 7 (treated with emulsions 1, 6 and 7 as per comparative tests 1, 2 and 3), the softness remaining after 3 washes is distinctly increased in the case of the specimens finished with the emulsions of the present invention. The droplet sink time as a measure of the hydrophilicity of the finished fabric is below ten seconds with all the specimens tested.

TABLE 1

| | Textile specimen number | | | | | | | | |
|---|---|---|---|---|---|---|---|---|---|
| Materials used | 1 | 2 | 3 | 4 | 5 | 6 | 7 | 8 | Blank |
| Emulsion 1 | 30 g/l | | | | | | | | |
| Emulsion 2 | | 30 g/l | | | | | | | |
| Emulsion 3 | | | 30 g/l | | | | | | |
| Emulsion 4 | | | | 30 g/l | | | | | |
| Emulsion 5 | | | | | 30 g/l | | | | |
| Emulsion 6 | | | | | | 30 g/l | | | |
| Emulsion 7 | | | | | | | 30 g/l | | |
| Emulsion 8 | | | | | | | | 30 g/l | |
| Acetic acid w = 60% | 1 g/l | 1 g/l | 1 g/l | 1 g/l | 1 g/l | 1 g/l | 1 g/l | 1 g/l | 1 g/l |
| Water, demineralized | 969 g/l | 969 g/l | 969 g/l | 969 g/l | 969 g/l | 969 g/l | 969 g/l | 969 g/l | 999 g/l |
| Wet pick-up | 80% | 80% | 80% | 80% | 80% | 80% | 80% | 80% | 80% |
| Drying | 2 min 120° C. | 2 min 120° C. | 2 min 120° C. | 2 min 120° C. | 2 min 120° C. | 2 min 120° C. | 2 min 120° C. | 2 min 120° C. | 2 min 120° C. |
| Curing | 2 min 170° C. | 2 min 170° C. | 2 min 170° C. | 2 min 170° C. | 2 min 170° C. | 2 min 170° C. | 2 min 170° C. | 2 min 170° C. | 2 min 170° C. |

TABLE 2

| | Textile specimen number | | | | | | |
|---|---|---|---|---|---|---|---|
| | 1 | 2 | 3 | 4 | 5 | 6 | Blank |
| Hand after finishing | 100% | 100% | 100% | 100% | 100% | 100% | 0% |
| Hand after one wash | 45% | 58% | 55% | 49% | 52% | 43% | 0% |
| Hand after three washes | 15% | 43% | 40% | 34% | 39% | 12% | 0% |

Hand assessment in % as relative comparison

TABLE 3

| | Textile specimen number | | |
|---|---|---|---|
| | 7 | 8 | Blank |
| Hand after finishing | 100% | 100% | 0% |
| Hand after one wash | 32% | 43% | 0% |
| Hand after three washes | 9% | 31% | 0% |

Hand assessment in % as relative comparison

We claim:

1. Siloxane copolymers preparable by
   (a) a first step of reacting
      organopolysiloxanes (1) which have at least one silicon-attached hydrogen atom per molecule with substantially linear oligomeric or polymeric compounds (2) of the general formula $$R^1-(A-C_nH_{2n})_m-A^1-H \qquad (I)$$

where $R^1$ is a univalent optionally substituted hydrocarbyl radical capable of adding Si—H groups in a hydrosilylation reaction,
   A is a bivalent polar organic radical selected from the group consisting of —O—, —C(O)—O—, —O—C(O)—, —O—C(O)—O—, —C(O)—NH—, —NH—C(O)—, urethane radical and urea radical,
   $A^1$ is a bivalent polar organic radical selected from the group consisting of —O—, —NH— and —NR'— wherein R' is a univalent hydrocarbyl radical of 1 to 18 carbon atoms,
   n is an integer from 1 to 20, and
   m is zero or a positive integer,
   (b) a second step of reacting
      the resulting H-$A^1$-containing intermediates (4) with organic compounds (5), which have two or more isocyanate groups per molecule, the reaction taking place in the presence of further organic compounds (6) and (7), which are reactive toward isocyanate groups, wherein the compounds (7) have the structures HB or HBH, where B is an organic radical having one or two hydrogen atoms reactive toward isocyanate groups, with the proviso that the compounds (6) contain at least one tertiary amine group,
      and that the compounds (7) are those which can be redetached again from the siloxane copolymer in a temperature range from 50° C. to 250° C., preferably 100° C. to 200° C., resulting once more in free isocyanate groups in the siloxane copolymer, and
   (c) a third step
      of the amino-containing intermediates (8) from step (b) being partially or completely quaternized with an alkylating agent (9),
      with the proviso that the water content of the compounds (1) and (2), which are used for preparing the siloxane copolymers, is lower than 2000 weight ppm, based on the total weight of compounds (1) and (2).

2. The siloxane copolymers according to claim 1, wherein the organic compounds (5), which have two or more isocyanate groups per molecule, are used in amounts of 0.5 to 1.0 mol of isocyanate group per mole of the sum total of isocyanate-reactive groups present in the intermediates (4) and the organic compounds (6) and (7).

3. The siloxane copolymers according to claim 1, wherein said organopolysiloxanes (1) have the general formula $$H_gR_{3-g}SiO(SiR_2O)_o(SiRHO)_pSiR_{3-g}H_g \qquad (III)$$

where R in each occurrence may be the same or different and is a univalent optionally substituted hydrocarbyl radical having 1 to 18 carbon atoms per radical,
g is 0, 1 or 2,
o is 0 or an integer from 1 to 1500, and
p is 0 or an integer from 1 to 200,
with the proviso that there is at least one silicon-attached hydrogen atom per molecule.

4. The siloxane copolymers according to claim 3, wherein said organopolysiloxanes (1) are α,ω-dihydrodiorganopolysiloxanes.

5. The siloxane copolymers according to claim 1, wherein A and $A^1$ in the formula (I) are an oxygen atom —O—.

6. The siloxane copolymers according to claim 1, wherein the compound (2) is a polyether of the general formula $$H_2C=CH-R^2-(OC_nH_{2n})_m-OH \qquad (IV)$$

where $R^2$ is a bivalent hydrocarbyl radical of 1 to 10 carbon atoms and
n and m are each as defined in claim 1.

7. The siloxane copolymers according to claim 1, wherein the compound (5) is a diisocyanate of the general formula $$O=C=N-R^3-N=C=O \qquad (V)$$

where $R^3$ is a bivalent hydrocarbyl radical having 4 to 40 carbon atoms per radical.

8. The siloxane copolymers according to claim 1, wherein the second step (b) utilizes further organic compounds (6) selected from the group consisting of compounds of the formulae $$HX-R^5-NR^4_2 \qquad (VI),$$

$$HX-R^6(NR^4_2)_2 \qquad (VII),$$

$$HX-R^7(NR^4_2)_3 \qquad (VIII),$$

$$(HX)_2R^6-NR^4_2 \qquad (IX),$$

$$HR^8N-R^5-NR^4_2 \qquad (X),$$

where $R^4$ is a univalent hydrocarbyl radical having 1 to 18 carbon atoms which may optionally contain oxygen, sulfur or nitrogen atoms,
$R^5$ is a bivalent hydrocarbyl radical of 1 to 100 carbon atoms, which may be interrupted or substituted by oxygen, sulfur or nitrogen atoms,
$R^6$ is a tervalent organic radical having 1 to 100 carbon atoms per radical,
$R^7$ is a tetravalent organic radical having 1 to 100 carbon atoms per radical, is a hydrogen atom or $R^4$, and
X is an oxygen atom or a sulfur atom, preferably an oxygen atom.

9. The siloxane copolymers according to claim 1, wherein compounds (7) comprise compounds of the HB type having an isocyanate-reactive hydrogen atom selected from the group consisting of oximes, phenols, lactams, malonates, acetoacetates, ketones, pyrazoles, hydroxamic acids, secondary monoamines and hydroxylamines, or compounds of the HBH type having two isocyanate-reactive hydrogen atoms and selected from the group consisting of dioximes, diphenols and secondary diamines.

10. The siloxane copolymers according to claim 1, wherein the third step (c) utilizes an alkylating agent (9) selected from the group consisting of methyl chloride, methyl iodide, dodecyl bromide, benzyl chloride, chloroacetic acid, dimethyl sulfate and methyl p-toluenesulfonate.

11. A process for preparing siloxane copolymers by
(a) a first step of reacting
organopolysiloxanes (1) which have at least one silicon-attached hydrogen atom per molecule with
substantially linear oligomeric or polymeric compounds (2) of the general formula

where $R^1$ is a univalent optionally substituted hydrocarbyl radical capable of adding Si—H groups in a hydrosilylation reaction, A is a bivalent polar organic radical selected from the group consisting of —O—, —C(O)—O—, —O—C(O)—, —O—C(O)—O—, —C(O)—NH—, —NH—C(O)—, urethane radical and urea radical, $A^1$ is a bivalent polar organic radical selected from the group consisting of —O—, —NH— and —NR'— wherein R' is a univalent hydrocarbyl radical of 1 to 18 carbon atoms, n is an integer from 1 to 20, m is zero or a positive integer, preferably from 5 to 50

(b) a second step of reacting
the resulting $H-A^1$-containing intermediates (4) with organic compounds (5), which have two or more isocyanate groups per molecule, the reaction taking place in the presence of further organic compounds (6) and (7), which are reactive toward isocyanate groups, wherein the compounds (7) have the structures HB or HBH, where B is an organic radical having one or two hydrogen atoms reactive toward isocyanate groups, with the proviso that the compounds (6) contain at least one tertiary amine group,
and that the compounds (7) are those which can be redetached again from the siloxane copolymer in a temperature range from 50° C. to 250° C., resulting once more in free isocyanate groups in the siloxane copolymer, and
(c) a third step
of the amino-containing intermediates (8) from step (b) being partially or completely quaternized with an alkylating agent (9),
with the proviso that the water content of the compounds (1) and (2), which are used for preparing the siloxane copolymers, is lower than 2000 weight ppm, based on the total weight of compounds (1) and (2).

12. Emulsions comprising
(A) siloxane copolymers according to claim 1, and
(B) water.

13. A process for producing the emulsions according to claim 12 by mixing of the siloxane copolymers with water.

14. A process for treating fiber-containing substrates, comprising contacting the substrates with siloxane copolymers according to claim 1.

* * * * *